United States Patent [19]

Gehman et al.

[11] Patent Number: 4,838,753
[45] Date of Patent: Jun. 13, 1989

[54] TRUCK TRACTOR FIFTH WHEEL-MOUNTED LIFTING AND TOWING UNIT

[75] Inventors: Roland P. Gehman, Stevens; Raymond G. Martin, East Earl, both of Pa.

[73] Assignee: MGS, Inc., Denver, Pa.

[21] Appl. No.: 162,775

[22] Filed: Mar. 1, 1988

[51] Int. Cl.⁴ ............................................. B60P 3/12
[52] U.S. Cl. ................................... 414/563; 280/402; 414/665; 414/667; 414/917
[58] Field of Search ............... 414/563, 917, 642, 665, 414/667, 669, 671, 710, 712; 280/402

[56] References Cited

U.S. PATENT DOCUMENTS

| | | | |
|---|---|---|---|
| 1,725,952 | 8/1929 | Beebe | 414/563 |
| 2,481,223 | 9/1949 | Johnson | 414/563 |
| 2,663,574 | 12/1953 | Martin | 280/415 |
| 3,384,390 | 5/1968 | Moiriat et al. | 280/423 |
| 3,532,239 | 10/1970 | May | 414/642 |
| 3,587,893 | 6/1971 | Laken | 414/563 X |
| 3,645,559 | 2/1972 | Stafford, Jr. | 280/415 B |
| 3,666,130 | 5/1972 | Ellerd | 414/608 |
| 3,715,042 | 2/1973 | Rellinger | 414/563 |
| 3,767,069 | 10/1973 | White, Jr. et al. | 414/563 |
| 3,837,673 | 9/1974 | McCarthy | 280/415 B |
| 3,888,369 | 6/1975 | Kesselring | 414/563 |
| 4,052,084 | 10/1977 | Propst | 280/406 |
| 4,149,643 | 4/1979 | Skala et al. | 414/563 |
| 4,152,006 | 5/1979 | Dunlap | 280/402 |
| 4,316,617 | 2/1982 | Flaugh | 280/402 |
| 4,544,175 | 10/1985 | Hubert | 280/402 |
| 4,555,214 | 11/1985 | Morton | 414/563 |
| 4,583,907 | 4/1986 | Wimberley | 414/917 X |
| 4,636,133 | 1/1987 | Hess | 414/917 X |
| 4,640,660 | 2/1987 | Watson | 414/563 |
| 4,674,944 | 6/1987 | Addleman | 414/917 X |
| 4,708,358 | 11/1987 | Gehman et al. | 414/563 X |

Primary Examiner—David A. Bucci
Attorney, Agent, or Firm—Michael R. Swartz; John R. Flanagan

[57] ABSTRACT

A lifting and towing unit mountable on a fifth wheel of a towing vehicle has an anchoring frame assembly with a king pin for coupling to the towing vehicle fifth wheel and a lifting frame assembly adapted to support a portion of a mobile load and to be releasably attached thereto and to the anchoring frame assembly in a fixed relation thereto. The unit also includes an arrangement in the form of a four-bar linkage interconnecting and mounting the lifting frame assembly rearwardly of and to the anchoring frame assembly for pivotal movement relative to the frame of the towing vehicle between lowered and raised positions. In the lowered position, load engaging structure of the lifting frame assembly is capable of being placed in a supporting relationship with the mobile load portion for lifting the mobile load into a towing relationship behind the towing vehicle, whereas in the raised position the lifting frame assembly load engaging structure is capable of supporting the mobile load at the portion thereof to maintain the mobile load in the towing relationship behind the towing vehicle. In the towing relationship, the anchoring and lifting frame assemblies form a substantially rigid towing beam interconnecting the fifth wheel of the towing vehicle and the mobile load such that the only load forces are a vertical downward force on the fifth wheel of the towing vehicle and a vertical downward force on the wheels of the towed mobile load.

30 Claims, 8 Drawing Sheets

Fig. I

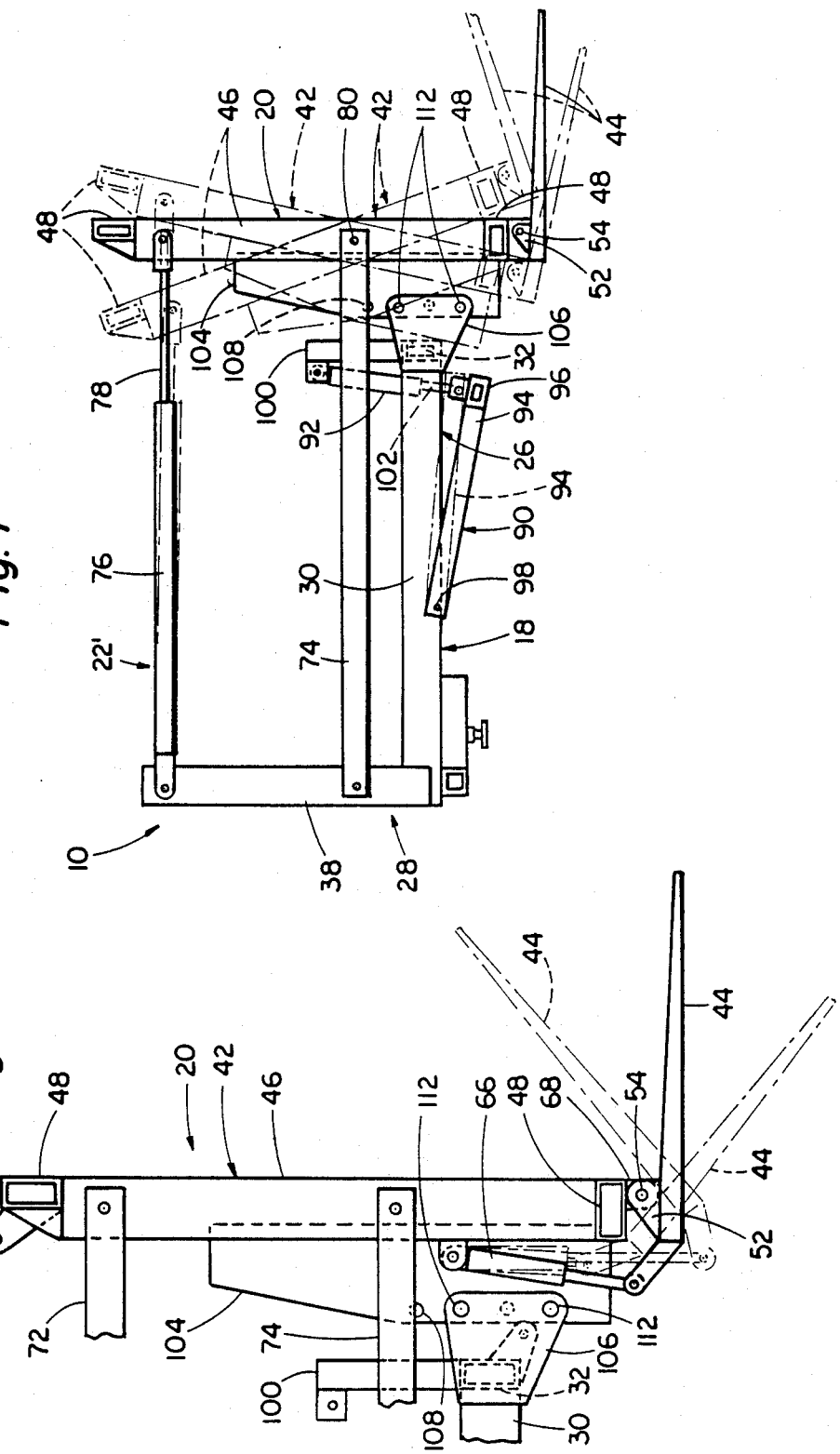

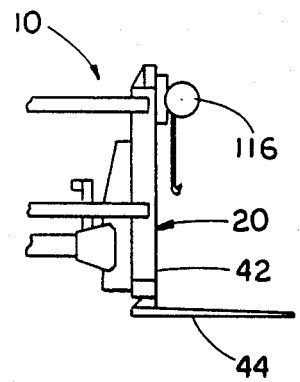
FIG. 19
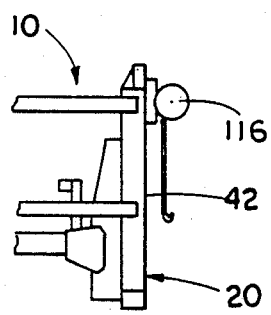
FIG. 20
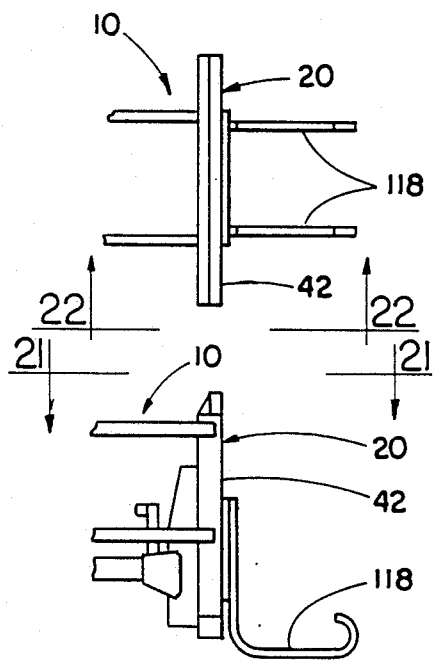
FIG. 21
FIG. 22

4,838,753

TRUCK TRACTOR FIFTH WHEEL-MOUNTED LIFTING AND TOWING UNIT

CROSS REFERENCE TO RELATED APPLICATION

Reference is hereby made to the following copending patent application dealing with related subject matter and assigned to the assignee of the present invention: "Disabled Truck Tractor Recovery Unit" by Roland P. Gehman et al, assigned U.S. Ser. No. 884,703 and filed Jul. 11, 1986, and now U.S. Pat. No. 4,708,358.

BACKGROUND OF THE INVENTION

1. Field of the Invention

The present invention relates generally to towing apparatus and, moe particularly, is concerned with an unit mountable on the fifth wheel of a truck tractor for lifting and towing a variety of different mobile loads.

2. Description of the Prior Art

It is conventional practice to provide a towing apparatus to enable a fifth wheel-bearing towing vehicle such as a truck tractor to connect with and tow a mobile load other than its normal trailer. Furthermore, apparently in the prior art, a particular towing apparatus is ordinarily designed for towing a specific type of mobile load. For example, U.S. Pat. Nos. (2,481,223) to Johnson, Rellinger (3,715,042), Parkes (4,047,733), Skala et al (4,149,643), Dunlap (4,152,006), Flaugh (4,316,617), Hubert (4,544,175) and Morton (4,555,214) disclose devices which appear to be particularly suited for towing another vehicle. In contrast thereto, U.S. Pat. Nos. (2,663,574) to Martin, Moiriat et al (3,384,390), Stafford, Jr. (3,645,559) and Berends (3,881,749) disclose devices that appear to be particularly adapted for towing low bed trailers carrying modular homes and other heavy, bulky cargo.

Presumably all of these devices achieve the objective of adapting a fifth wheel-bearing truck tractor for the purpose of connecting with and towing a particular type of mobile load. However, it would be desirable to have just one device which could be used for towing a variety of different types of mobile loads so that it would not be necessary to have a separate device for towing each specific type of load.

Consequently, a need still exists for renewed efforts to come up with a device which has a more universal application. Such device would be one that will accommodate towing of a variety of different types of mobile loads without requiring complicated and difficult adjustments to and conversions of the parts thereof.

SUMMARY OF THE INVENTION

The present invention provides a fifth wheel-mountable lifting and towing unit designed to satisfy the aforementioned needs. The unit of the present invention is adapted for use in lifting and towing diverse types of mobile loads. One type of load is a large shipping container which is typically removed from a ship, mounted on a set of bogie wheels and then pulled by a truck tractor. The unit of the present invention can be used to lift one end of the container for placing the set of bogie wheels thereunder and then to lift and tow the container from the opposite end. The unit can also be used to lift and tow a disable vehicle as well as other types of mobile loads, such as a house trailer.

The safety of the unit is enhanced by its utilization of a method which results in its operation being close to that of normal tractor trailer operations. The unit advantageously directs the weight of the load onto the road via the fifth wheel of the towing tractor, as the driver is accustomed to when hauling a trailer. The towed load rests at one end on its wheels and is supported at the other end on the fifth wheel of the towing tractor by a rigid connection provided by the unit. Thus, the only load forces are a vertical downward force on the wheels of the towed load and a vertical downward force on the fifth wheel of the towing vehicle, the same forces experienced in normal tractor trailer operations.

Accordingly, the present invention is directed to a lifting and towing unit for use by a towing vehicle having a fifth wheel supported on a frame of the towing vehicle. The lifting and towing unit comprises: (a) an anchoring frame assembly having a generally horizontal structure with front and rear portions and being adapted to be coupled at its front portion to a fifth wheel of a towing vehicle, the anchoring frame assembly also having a generally vertical structure rigidly mounted upright to the front portion of the horizontal structure; (b) a lifting frame assembly having an upright structure and load engaging structure mounted to the upright structure and being adapted to support a portion of a mobile load and to be releasably attached thereto; (c) a linkage arrangement extending between and interconnecting the upright structure of the lifting frame assembly to the vertical structure of the anchoring frame assembly for providing pivotal movement of the lifting frame assembly relative to a frame of the towing vehicle between a lowered position wherein the load engaging structure of the lifting frame assembly is capable of being placed in a supporting relationship with the mobile load portion for lifting the mobile load into a towing relationship behind the towing vehicle and a partially raised position wherein the load engaging structure of the lifting frame assembly is capable of supporting the mobile load at the portion thereof to maintain the mobile load in the towing relationship behind the towing vehicle; and (d) an actuating mechanism being selectively operable to move the lifting frame assembly relative to the frame of the towing vehicle from a fully raised position located above the partially raised position to the lowered position for placing the load engaging structure of the lifting frame assembly in the supporting relationship with the mobile load portion and from the lowered to fully raised position for lifting the mobile load into the towing relationship.

More particularly, the linkage arrangement includes laterally spaced pairs of upper and lower generally parallel extending link arms extending between and interconnecting the upright structure of the lifting frame assembly and the vertical structure of the anchoring frame assembly so as to form a four-bar linkage providing pivotal movement of the lifting frame assembly relative to the frame of the towing vehicle between the lowered and partially raised positions. In addition, the actuating mechanism includes first and second actuating means. The first actuating means is selectively operable to move the lifting frame assembly relative to the anchoring frame assembly between the lowered position and a partially raised position spaced below the fully raised position. The second actuating means is selectively operable to move the anchoring frame assembly relative to the frame of the towing vehicle after being coupled to the fifth wheel thereof and thereby move the lifting assembly relative to the vehicle frame between the partially and fully raised positions.

Still further, the unit includes locking means for connecting the upright structure of the lifting frame assembly to the rear portion of the horizontal structure of the anchoring frame assembly after the lifting frame assembly is moved to the partially raised position to form the anchoring and lifting frame assemblies into a substantially rigid towing beam interconnecting the fifth wheel of the towing vehicle and the mobile load.

Also, the load engaging structure of the lifting frame assembly can be rearwardly projecting members laterally spaced apart from one another and mounted to the upright structure of the lifting frame assembly. The members are mounted to the upright structure for pivotal movement between generally horizontal support and vertical storage positions. Also, the load engaging structure can take other forms, for example, a power wrench or a carriage unit.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 6 is a fragmentary side elevational view of the unit, showing the forklift frame assembly having a telescopible actuator for pivoting the tines relative to the upright structure of the forklift frame assembly between the respective positions illustrated in solid and phantom line form.

FIG. 7 is a side elevational view of the unit, showing one side of its four-bar linkage having a telescopible actuator incorporated therein for pivoting the forklift frame assembly relative to an anchoring frame assembly of the unit.

FIG. 19 is a fragmentary side elevational view of the unit showing a power winch mounted to the upright structure of the lifting frame assembly along with rearwardly projecting members.

FIG. 20 is another fragmentary side elevational view of the unit showing the power winch of FIG. 19 mounted to the upright structure of the lifting frame assembly but without the rearwardly projecting members being used.

FIG. 21 is a fragmentary top plan view of the unit as seen along line 21—21 of FIG. 22, showing a carriage unit mounted on the upright structure of the lifting frame assembly.

FIG. 22 is a fragmentary side elevational view of the unit as seen along line 22—22 of FIG. 21.

DETAILED DESCRIPTION OF THE INVENION

Figure 1:
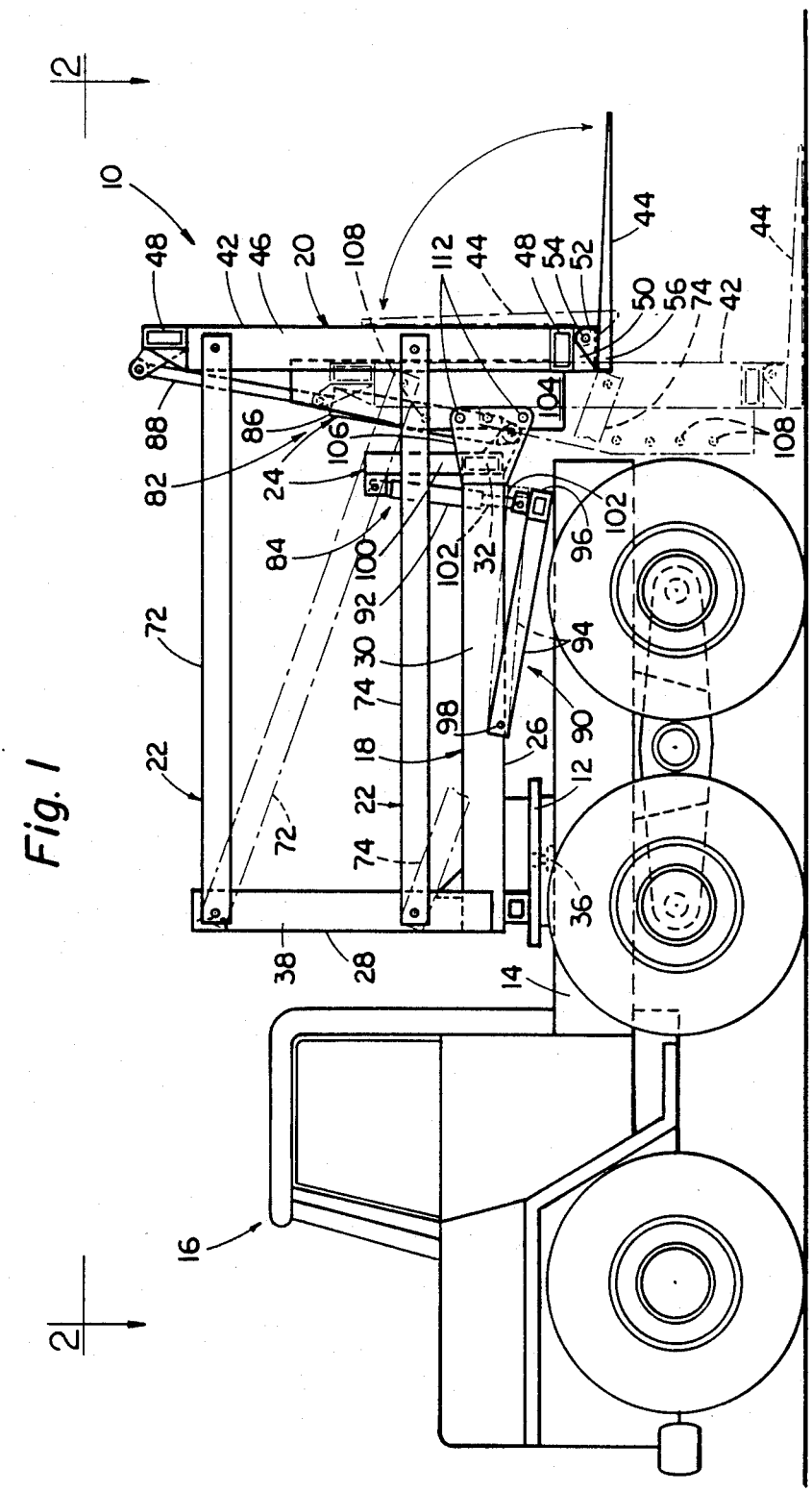
FIG. 1 is a side elevational view of the lifting and towing unit of the present invention mounted on a towing truck tractor, showing the raised and lowered positions of the forklift frame assembly respectively in solid and phantom line forms and the horizontal and vertical positions of the tines respectively in solid and phantom line forms.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Figure 2:
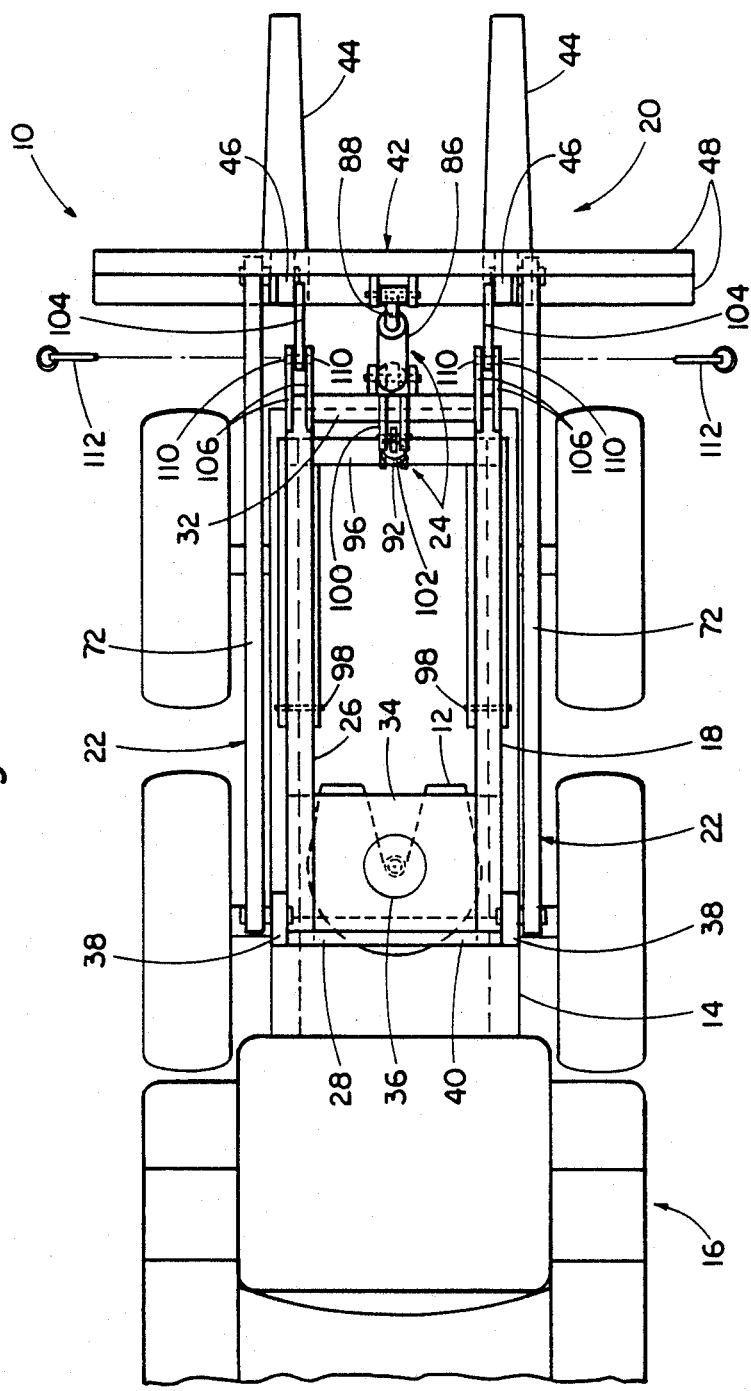
FIG. 2 is a top plan view of the tractor and unit as seen along line 2—2 of FIG. 1.
Figure 3:
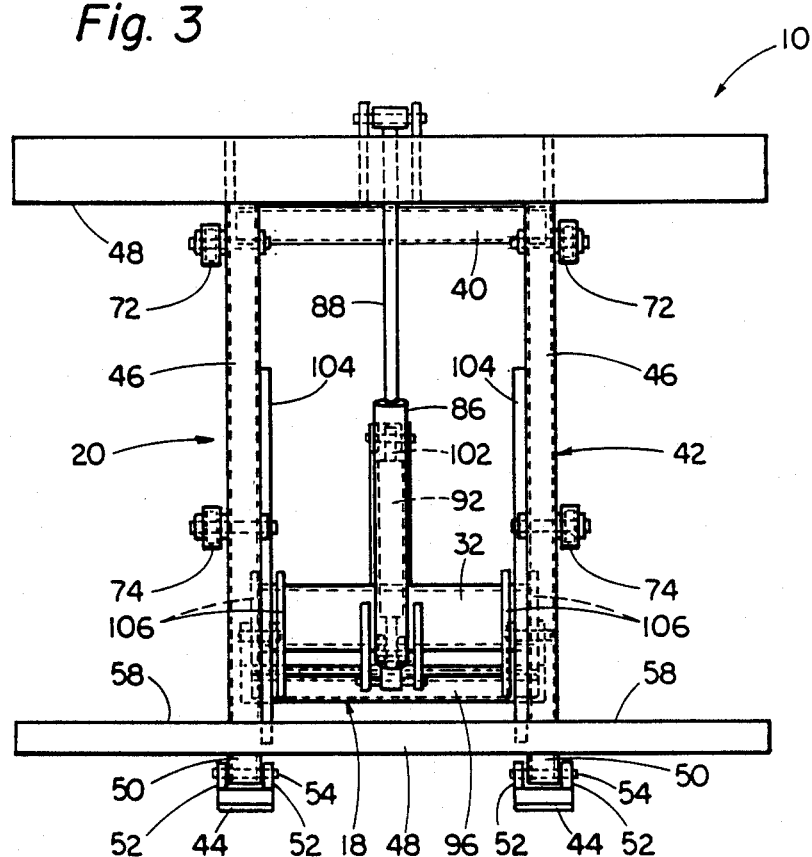
FIG. 3 is a rear elevational view of the unit without the tractor.

Referring now to the drawings, and particularly to FIGS. 1-3, there is shown a preferred embodiment of a lifting and towing unit, generally designated by the numeral 10 and constructed in accordance with the present invention, being mounted on the fifth wheel 12 supported on a frame 14 of a towing vehicle 16, such as a truck tractor. The lifting and towing unit 10 of the present invention is adapted for use on the towing vehicle 16 in lifting and towing diverse types of mobile loads. The unit 10 basically includes an anchoring frame assembly 18, a lifting frame assembly 20, a linkage arrangement 22 and an actuating mechanism 24.

More particularly, the anchoring frame assembly 18 has a generally horizontal structure 26 with front and rear portions and a generally vertical structure 28 rigidly mounted upright adjacent to the front portion of the horizontal structure 26. The horizontal structure 26 of the assembly 18 is composed of respective pairs of spaced longitudinal beams 30 and a cross beam 32 being rigidly interconnected to one another in a generally rectangular open configuration. The assembly 20 also has a plate 34 fixed across the beams 30 at the front portion of the horizontal structure 26 and mounting a downwardly extending king pin 36 adapted to be coupled to the fifth wheel 12 of the towing vehicle 16. The vertical structure 28 of the assembly 18 is composed of respective pairs of spaced vertical beams 38 and a cross beam 40 being rigidly interconnected to one another in another generally rectangular open configuration.

Figure 11:
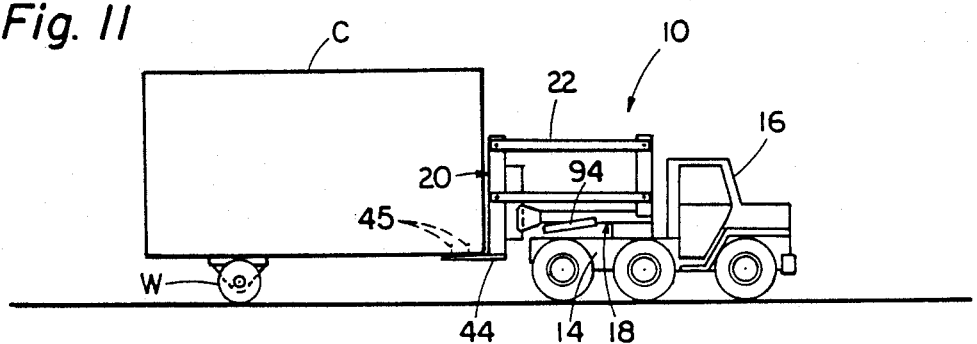
Figure 17:
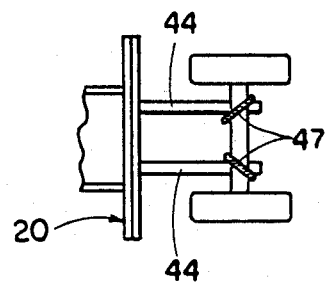
FIG. 17 is an enlarged fragmentary schematic top plan view of the towing arrangement of FIG. 16, showing the use of chains to attach and clamp the truck axle to the rearwardly projecting members of the lifting frame assembly of the unit.

The lifting frame assembly 20 of the unit 10 has a generally upright structure 42 and a load engaging structure in the form of a pair of rearwardly projecting members 44 laterally spaced apart from one another and mounted to the upright structure 42 adjacent to a lower end thereof. The upright structure 42 of the assembly 20 is composed of respective pairs of spaced upright beams 46 and cross beams 48 being rigidly interconnected to one another in yet another generally rectangular open configuration. The rearwardly projecting members 44 are adapted to support a forward portion of a mobile load and to be releasable in a clamping relation, such as by use of bolts 45 in FIG. 11 or a conventional link chain 47 in FIGS. 14 and 17.

As seen in the one mounting arrangement in FIGS. 1-3, the rearwardly projecting members 44 are mounted to the lower ends 50 of the upright beams 46 for pivotal movement relative thereto between generally horizontal support and vertical storage positions. The members 44 normally rest in their horizontal positions due to the coaction of the gravity with the way in which the members are pivotally mounted to the lower ends 50 of the beams 46. Specifically, each member 44 has a pair of spaced upstanding brackets 52 which extend upwardly on opposite lateral sides of the lower beam end 50. A pivot pin 54 extends through the beam end 50 and the brackets 52 to pivotally mount the member 44 to the beam 46 so that most of the member projects rearwardly from the pivot pin 54 and the beam in cantilever fashion and only a short forward end 56 of the member projects forwardly from the pivot pin 54 so as to underlie and abut upwardly against the bottom of the beam end 52.

Figure 4:
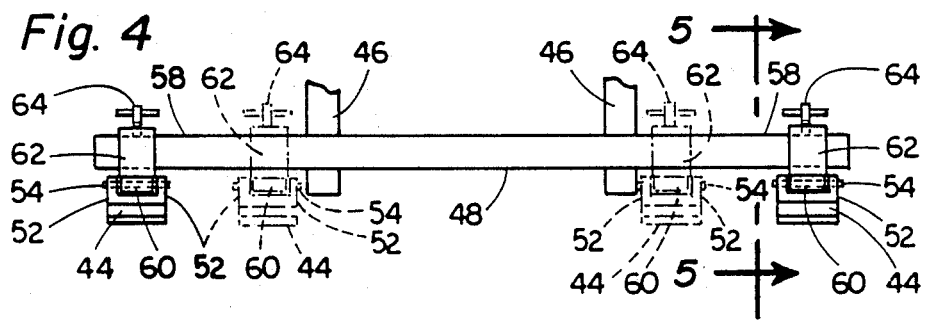
FIG. 4 is a fragmentary rear elevational view of the unit without the tractor, showing the tines of the forklift frame assembly of the unit being mounted on the lower portion of an upright structure thereof for clamping at laterally-adjustable spaced apart positions thereon.
Figure 5:
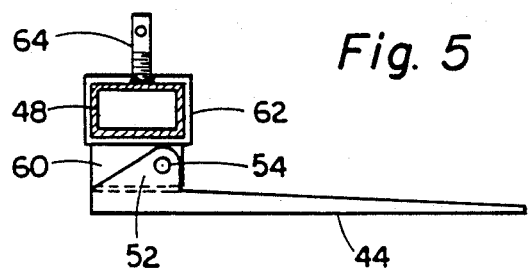
FIG. 5 is an enlarged side elevational view, partly in section, of one of the tines as seen along lines 5--5 of FIG. 4.

A modified mounting arrangement of the rearwardly projecting members 44 is seen in FIGS. 4 and 5. Instead of being mounted to the lower ends 50 of the upright beams 46 of the upright structure 42, the members 44 are mounted to opposite end portions 58 of the lower one of the cross beams 48 of the upright structure, which end portions 58 extend laterally outward from the respective lower ends 50 of the upright beams. In addition, now the upstanding brackets 52 on the members 44 are mounted by pivot pins 54 to brackets 60 fixed to and depending below sleeves 62 which are slidably mounted on the lower cross beam end portions 58. A fastener 64 is threaded vertically through the upper side of each sleeve 62 for engaging the respective cross beam end portion 58 to set the respective sleeve 62 and thereby the member 44 pivotally mounted thereto at a particular desired position along the lower cross beam 48. In such manner, the members 44 in this modified mounting arrangement are releasably mounted to the lower end of the upright structure 42 for laterally-adjusted movement toward and away from one another. However, the members 44 still normally project rearwardly from the upright structure 42 and rest in their horizontal support positions, and can pivot to vertical storage positions, the same as in the mounting arrangement of FIGS. 1-3.

In another modified mounting arrangement of the rearwardly projecting members 44 shown in FIG. 6, a telescopible actuator 66 is provided for pivoting the members 44 in vertical planes relative to the upright structure 42. The upstanding brackets 52 on the members 44 (only one member being seen in FIG. 6) are mounted by pivot pins 54 to brackets 68 fixed to. and depending below the lower one of the cross beams 48 of the upright structure 42. The actuator 66 is pivotally interconnected at its upper and lower opposite ends to the one upright beam 46 of the upright structure 42 and to the one member 44 (the members are, in turn, connected together by a cross bracket not shown) and is operable to pivotally move the members relative to the upright structure as its piston rod 70 is extended and retracted.

The linkage arrangement 22 of the unit 10 pivotally mounts the lifting frame assembly 20 to the anchoring frame assembly 18. More particularly, the linkage arrangement 22 is composed of laterally spaced apart pairs of upper and lower generally parallel extending link arms 72, 74 extending between and interconnecting the upright structure 42 of the lifting frame assembly 20 and the vertical structure 28 of the anchoring frame assembly 18. The link arms 72, 74 form a four-bar linkage swingable in an arcuate path to provide pivotal movement of the lifting frame assembly 20 relative to the frame 14 of the towing vehicle 16 and to the anchoring frame assembly 18 in a substantially vertical direction away from and toward lowered and fully raised positions, as shown in phantom and solid line form in FIG. 1.

Figure 8:
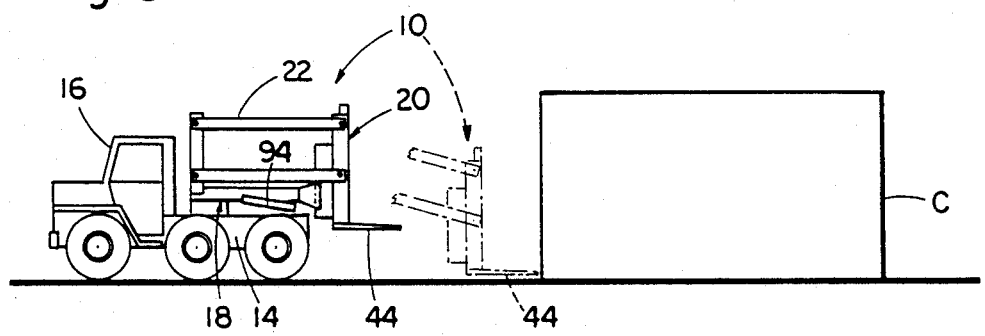
FIGS. 8-11 are sequences of side elevational views illustrating the unit at successive stages in which it is being used to set up a mobile load in the form of a large shipping container for towing behind a truck tractor.
Figure 9:
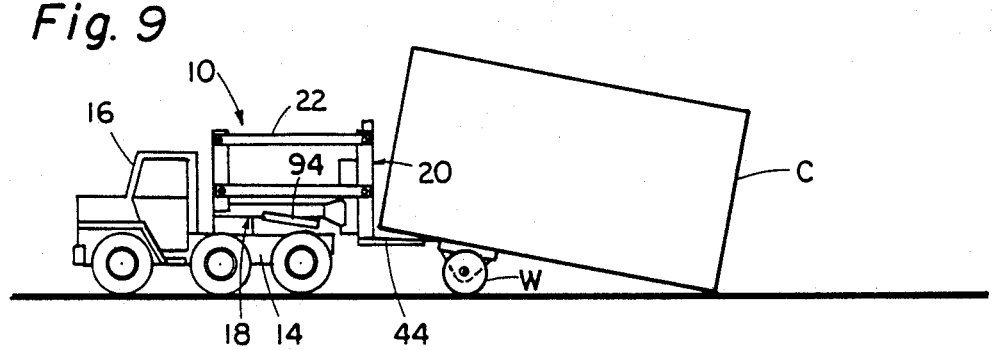
Figure 10:
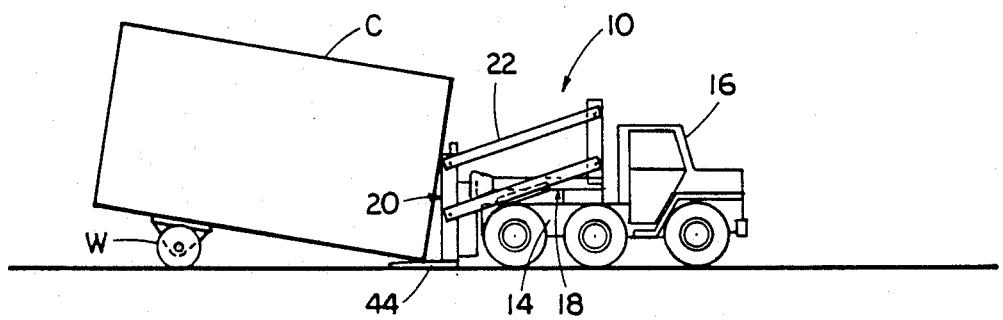
Figure 12:
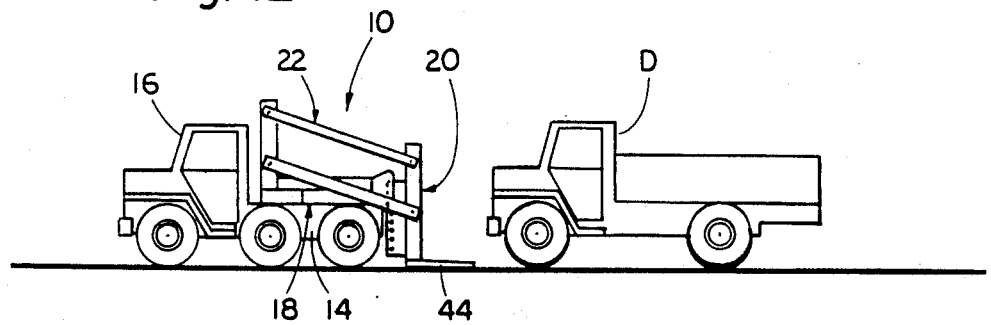
FIGS. 12 and 13 are a sequence of side elevational views illustrating the unit at successive stages in which it is being used to lift and tow another mobile load in the form of a disabled vehicle behind a truck tractor.
Figure 13:
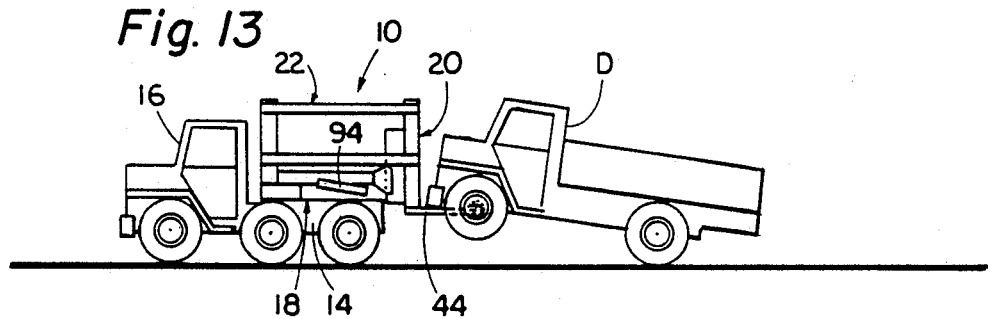
Figure 14:
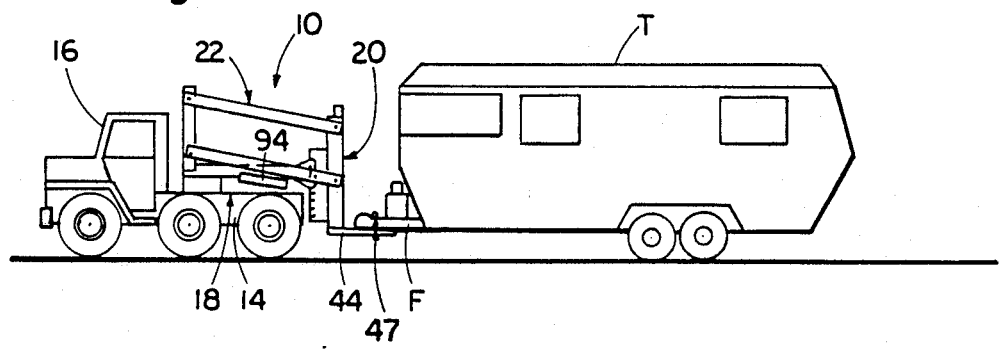
FIG. 14 is a side elevational view illustrating the unit being used to lift and tow still another mobile load in the form of a travel trailer.
Figure 15:
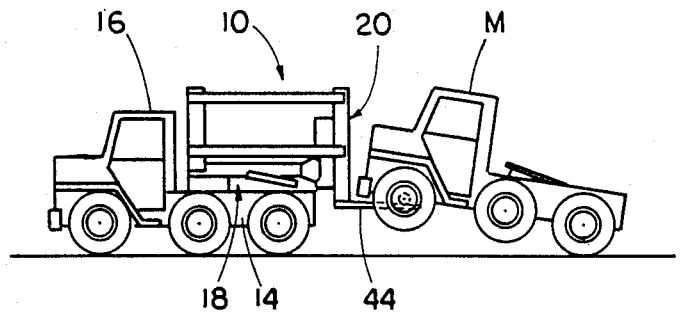
FIGS. 15 and 16 are side elevational views illustrating the unit being used to lift and tow yet another mobile load, in the form of a disabled military truck, from the front and rear thereof respectively.
Figure 16:
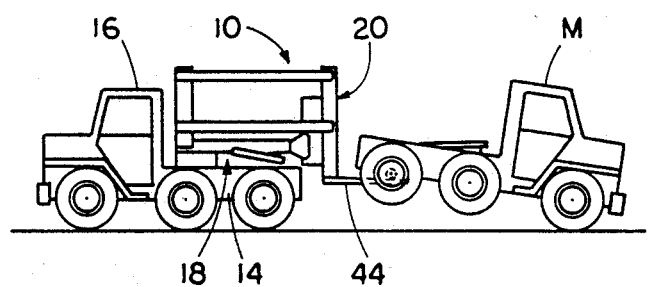

In the lowered position of the lifting frame assembly 20, its rearward projecting members 44 are capable of being placed in a supporting relationship under a forward portion of a mobile load for lifting the mobile load into a towing relationship behind the towing vehicle 16. For example, in FIGS. 8 and 10, the members 44 are shown successively inserted under the front and rear ends of a shipping container C for mobilizing the same with a set of bogie wheels W and then placing the mobilized container C in towing relationship. In FIG. 12, the members 44 are shown ready to be inserted under the front end of a disabled truck D. In FIG. 14, the members 44 are shown supporting a travel trailer T at its tongue F. In FIGS. 15 and 16, the members 44 are shown supporting a disabled military truck M at its front and rear ends respectively. In the fully raised position of the lifting frame assembly 20, its rearwardly projecting members 44 are capable of being clamped to and supporting the mobile load at the front portion thereof to maintain the mobile load in the towing relationship behind the towing vehicle 16. Refer to FIGS. 11, 13-16 wherein mobile loads respectively in the form of mobilized shipping container C, disabled truck D, and travel trailer T and the disabled military truck M are supported in towing relationship behind the towing vehicle 16 by the members 44 of the lifting frame assembly 20 of the unit 10.

In a modified embodiment of the linkage arrangement identified as 22' in FIG. 7, each of the upper link arms 72 of the arrangement 22 is replaced by a telescopible actuator 76. The actuator 76 is attached at its opposite ends to respective upper ends of the vertical beams 38 of the anchoring frame assembly vertical structure 28 and the upright beams 46 of the lifting frame assembly upright structure 42. The actuators 76 (only one being shown) are operable to extend and retract the piston rods 78 thereof to cause pivoting of the upright structure 42 of the lifting frame assembly 20 about its pivotal connection at 80 to each of the lower link arms 74 of the pairs thereof between the angular displaced positions shown in phantom and solid line form in FIG. 7.

For moving the lifting frame assembly 20 relative to the towing vehicle frame 14, the actuating mechanism 24 of the unit 10 is provided, as seen in FIGS. 1-3. More particularly, the actuating mechanism 24 includes a first actuating means 82 and a second actuating means 84. The first actuating means 82 is selectively operable to move the lifting frame assembly 20 relative to the anchoring frame assembly 18 between the lowered position and a partially raised position spaced below the fully raised position for placing the rearward projecting members 44 of the assembly 20 in the aforementioned supporting relationship with the front portion of the mobile load and for then lifting the mobile load into the towing relationship. The second actuating means 84 is selectively operable to move the anchoring frame assembly 18 relative to the vehicle frame 14 and thereby move the lifting frame assembly 20 relative to the vehicle frame 14 and the anchoring frame assembly 18 (after being rigidly attached thereto as explained below) between the partially and fully raised positions.

Specifically, the first actuating means 82 is a telescopible actuator 86 pivotally attached at its opposite ends to and extending between the upper cross beam 48 of the lifting frame assembly upright structure 42 and the rear cross beam 32 of the anchoring frame assembly horizontal structure 26. Extension of a piston rod 88 of the actuator 86 raises the lifting frame assembly 20, whereas retraction of the piston rod 88 lowers the assembly 20. The second actuating means 84 includes a U-shaped auxiliary frame assembly 90 and another telescopible actuator 92. The auxiliary frame assembly 90 is formed by a pair of laterally spaced legs 94 and a transverse member 96 extending between and rigidly interconnecting the legs 94. The front ends of the legs 94 are pivotally attached to the longitudinal beams 30 of the anchoring frame horizontal structure 26 intermediate their ends by pins 98. The actuator 92 extends between and is pivotally attached at its opposite ends to the middle of the transverse member 96 and to the upper end of an upright post 100 fixed to the middle of the rear cross beam 32 of the anchoring frame assembly horizontal structure 26. Extension of a piston rod 102 of the actuator 92 raises the horizontal structure 26 and thereby the anchoring frame assembly 18 relative to the vehicle frame 14 with the transverse member 96 of the auxiliary frame assembly 90 engaging the frame 14 and pivots the fifth wheel 12 being coupled the anchoring frame assembly 18. Retraction of the piston rod 102 lowers the horizontal structure downwardly toward the vehicle frame 14.

For moving the lifting frame assembly 20 with the anchoring assembly 18 upon actuating the auxiliary frame assembly actuator 92, the former assembly 20 must be attached to the latter assembly 18. For this purpose, locking means are provided in the form of a plate 104 attached to and extending forwardly of each of the upright beams 46 of the lifting frame assembly upright structure 42 and a pair of plates 106 attached to and extending rearwardly of the rear end of each of the longitudinal beams 30 of the anchoring frame assembly horizontal structure 26. The plates 104, 106 have complementary elements in the form of rows of vertically spaced apertures 108, 110 respectively defined therein which are alignable with one another. Releasable fastener elements in the form of releasable latching pins 112 are provided for insertion through certain aligned ones of the apertures 108, 110 for interengaging the plates 104, 106 and thereby interconnecting the upright structure 42 of the lifting frame assembly 20 to the horizontal structure 26 of the anchoring frame assembly 18 after the lifting frame assembly 20 has been moved to its partially raised position. The anchoring and lifting frame assemblies 18, 20 are thusly formed into a substantially rigid towing beam interconnecting the fifth wheel 12 of the towing vehicle 16 and the mobile load. With the anchoring and lifting frame assemblies 18, 20 rigidly attached together by pins 112 interengaging plates 104, 106 and with the lifting frame assembly 20 rigidly clamped to the mobile load so as to form the rigid towing beam therebetween the fifth wheel 12 and the mobile load, the piston rod 102 of the cylinder 92 is then retracted to lift the legs 94 of the auxiliary frame assembly 90 upwardly from contact with the vehicle frame 14 to the position shown in dashed line form in FIGS. 1 and 7 and in solid line form in FIGS. 11 and 13-16.

As mentioned earlier, the unit 10 of the present invention is adapted for use in lifting and towing diverse types of mobile loads. As seen in FIGS. 8-11, one type of load is the large shipping container C which is typically removed from a ship, mounted on a set of bogie wheels W by use of the unit 10, mounted on the towing vehicle 16 with the members 44 of the unit 10 attached and clamped by the bolts 45 under the front portion of the container C. The unit 10 is used to lift one end of the container C for placing the bogie wheels W thereunder and then to lift and tow the container from the opposite end. The unit 10 can also be used to lift and tow the disabled vehicle D of FIGS. 12 and 13, as well as other types of mobile loads, such as the travel trailer T in FIG. 14 and the disabled military truck M in FIGS. 15 and 16.

Figure 18:
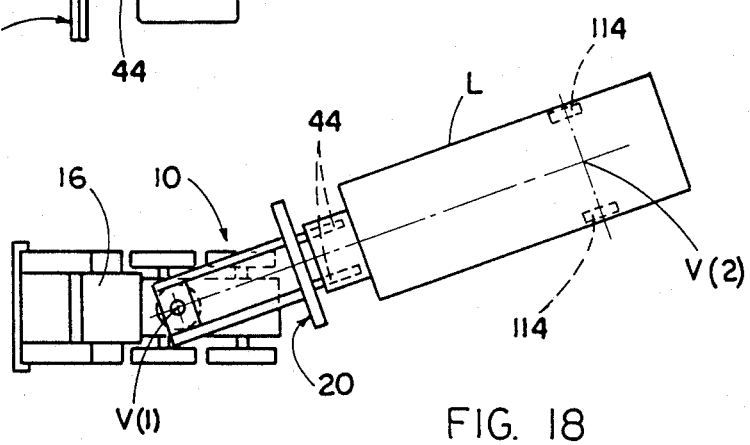
FIG. 18 is a schematic top plan view of a towing arrangement wherein the towing vehicle is turning relative to the towed load, the view clearly representing how the unit and towed load form a rigid structure which rotates about the fifth wheel of the towing vehicle, just like in a normal tractor trailer arrangement.

Referring to FIG. 18, it can be seen that with the unit 10 providing a rigid connection between the fifth wheel 12 of the towing vehicle 16 and the towed mobile load L, when the towing vehicle 16 turns relative to the mobile load L the latter together with the unit 10 rotate together about the fifth wheel 12 the same as a trailer does in a normal tractor trailer arrangement. The only load forces are a vertical downward force V(1) on the fifth wheel 12 of the towing vehicle 16 and a vertical downward force V(2) on the wheels 114 of the towed load L.

Turning now to FIGS. 19-22, there is shown other examples of load engaging structures which can be mounted on the lifting frame assembly 20 for supporting the mobile loads. FIG. 19 illustrates a power winch 116 mounted to the upright structure 42 of the lifting frame assembly 20 of the unit 10 along with the rearward projecting members 44. FIG. 20 depicts the power winch 116 mounted to the upright structure 42 of the lifting frame assembly 20 but without the members 44 of FIG. 19 being used. FIGS. 21 and 22 illustrate a sling or carriage unit 118, instead of the members 44, mounted on the upright structure 42 of the lifting frame assembly 20 of the unit 10 for supporting the mobile load.

It is thought that the fifth wheel-mounted lifting and towing unit of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. A lifting and towing unit for use by a towing vehicle having a fifth wheel supported on a frame of the towing vehicle, said unit comprising:
   (a) an anchoring frame assembly having a generally horizontal structure with front and rear portions and being adapted to be coupled at said front portion to a fifth wheel of a towing vehicle, said anchoring frame assembly also having a generally vertical structure rigidly mounted upright to said front portion of said horizontal structure;
   (b) a lifting frame assembly having an upright structure and load engaging structure mounted to said upright structure and being adapted to support a portion of a mobile load and to be releasably attached thereto;
   (c) a linkage arrangement extending between and interconnecting said upright structure of said lifting frame assembly to said vertical structure of said anchoring frame assembly for providing pivotal movement of said lifting frame assembly relative to a frame of the towing vehicle away from and toward a lowered position wherein said load engaging structure of said lifting frame assembly is capable of being placed in a supporting relationship with the mobile load portion for lifting the mobile load into a towing relationship behind the towing vehicle and a fully raised position wherein said load engaging structure of said lifting frame assembly is capable of supporting the mobile load at the portion thereof to maintain the mobile load in said towing relationship behind the towing vehicle;
   (d) an actuating mechanism being selectively operable to move said lifting frame assembly relative to the frame of the towing vehicle from said fully raised to said lowred position for placing said load engaging structure of said lifting frame assembly in said supporting relationship with the mobile load portion and from said lowered to said fully raised position for lifting the mobile load into said towing relationship; and
   (e) locking means for connecting said upright structure of said lifting frame assembly to said rear portion of said horizontal structure of said anchoring frame assembly after said lifting frame assembly is moved to a partially raised position to form said anchoring and lifting frame assemblies into a substantially rigid towing beam interconnecting the fifth wheel of the towing vehicle and the mobile load.

2. The unit as recited in claim 1, wherein said horizontal structure of said anchoring frame assembly has a king pin mounted at said front portion for coupling to the fifth wheel of the towing vehicle.

3. The unit as recited in claim 1, wherein said locking means includes:
   complementary elements respectively defined on said upright structure of said lifting frame assembly and on said rear portion of said horizontal structure of said anchoring frame assembly being alignable with one another;
   releasable fastener elements for interengaging said complementary elements when the latter are aligned with one another and thereby interconnecting said upright structure of said lifting frame assembly to said horizontal structure rear portion of said anchoring frame assembly.

4. The unit as recited in claim 3, wherein:
   said complementary elements are pairs of apertures defined in said upright structure of said lifting frame assembly and in said horizontal structure rear portion of said anchoring frame assembly; and
   said fastener elements are releasable latching pins.

5. The unit as recited in claim 1, wherein said load engaging structure of said lifting frame assembly is rearwardly projecting members laterally spaced apart from one another and mounted to said upright structure of said lifting frame assembly adjacent to a lower end thereof.

6. The unit as recited in claim 5, wherein said members are releasably mounted to said upright structure for laterally-adjusted movement toward and away from one another.

7. The unit as recited in claim 5, wherein said members are mounted to said upright structure for pivotal movement between generally horizontal support and vertical storage positions.

8. The unit as recited in claim 5, wherein:
   said members are mounted to said upright structure for pivotal movement relative thereto; and
   said unit further comprises a telescopible actuator pivotally interconnected at its opposite ends to said upright structure and said members and being operable to pivotally move said members relative to said upright structure.

9. The unit as recited in claim 1, wherein said load engaging structure of said lifting frame assembly is a power winch mounted to said upright structure.

10. The unit as recited in claim 1, wherein said load engaging structure of said lifting frame assembly is a carriage unit mounted to said upright structure adjacent to a lower end thereof.

11. The unit as recited in claim 1, wherein said actuating mechanism includes:
    first actuating means being selectively operable to move said lifting frame assembly relative to said anchoring frame assembly between said lowered position and a partially raised position spaced below said fully raised position.

12. The unit as recited in claim 11, wherein said first actuating means is a telescopible actuator pivotally attached at its opposite ends to and extending between an upper end of said upright structure of said lifting frame assembly and said rear portion of said horizontal structure of said anchoring frame assembly.

13. The unit as recited in claim 1, wherein said linkage arrangement includes:
    laterally spaced apart pairs of upper and lower generally parallel extending link arms extending between and interconnecting said upright frame structure of said lifting frame assembly and said vertical structure of said anchoring frame assembly so as to form a four-bar linkage providing pivotal movement of said lifting frame assembly relative to the frame of said towing vehicle toward and away from said lowered and fully raised positions.

14. The unit as recited in claim 13, wherein each of said upper link arms of said pairs thereof is a telescopible actuator being attached at opposite ends to upper ends of said vertical structure of said anchoring frame assembly and said upright structure of said lifting frame assembly and being operable to pivot said upright structure of said lifting frame assembly about its connection to each of said lower link arms of said pairs thereof.

15. A lifting and towing unit for use by a towing vehicle having a fifth wheel supported on a frame of the towing vehicle, said unit comprising:
  (a) an anchoring frame assembly having a generally horizontal structure with front and rear portions and adapted to be coupled at said front portion to a fifth wheel of a towing vehicle, said anchoring frame assembly also having a generally vertical structure rigidly mounted upright to said front portion of said horizontal structure;
  (b) a lifting frame assembly having an upright structure and a load engaging structure mounted to said upright structure and being adapted to support a portion of a mobile load and to be releasably attached thereto;
  (c) a linkage arrangement extending between and interconnecting said upright structure of said lifting frame assembly to said vertical structure of said anchoring frame assembly for providing pivotal movement of said lifting frame assembly relative to a frame of the towing vehicle away from and toward a lowered position wherein said load engaging structure of said lifting frame assembly is capable of being placed in a supporting relationship with the mobile load portion for lifting the mobile load into a towing relationship behind the towing vehicle and a fully raised position wherein said load engaging structure of said lifting frame assembly is capable of supporting the mobile load at the portion thereof to maintain the mobile load in said towing relationship behind the towing vehicle;
  (d) said linkage arrangement including laterally spaced apart pairs of upper and lower generally parallel extending link arms extending between and interconnecting said upright structure of said lifting frame assembly and said vertical structure of said anchoring frame assembly so as to form a four-bar linkage providing pivotal movement of said lifting frame assembly relative to the frame of the towing vehicle toward and away from said lowered and fully raised positions; and
  (e) an actuating mechanism being selectively operable to move said lifting frame assembly relative to the frame of the towing vehicle from said fully raised position to said lowered position for placing said load engaging structure of said lifting frame assembly in said supporting relationship with the mobile load portion and from said lowered position to said fully raised position for lifting the mobile load into said towing relationship;
  (f) said actuating mechanism including first actuating means being selectively operable to move said lifting frame assembly relative to said anchoring frame assembly between said lowered position and a partially raised position spaced below said fully raised position;
  (g) said actuating mechanism also including second actuating means being selectively operable to move said anchoring frame assembly relative to the frame of the towing vehicle after being coupled to the fifth wheel thereof and thereby move said lifting frame assembly relative to the vehicle frame between said partially and fully raised positions.

16. The unit as recited in claim 15, wherein:
said load engaging structure in the form of rearwardly projecting members being mounted to said upright frame structure adjacent a lower end thereof for pivotal movement relative thereto; and said unit further comprises a telescopible actuator pivotally interconnected at its opposite ends to said upright structure and said rearwardly projecting members and being operable to pivotally move said members relative to said upright structure.

17. The unit as recited in claim 15, wherein said actuating means is a telescopible actuator pivotally attached at its opposite ends to and extending between an upper end of said upright structure of said lifting frame assembly and said rear portion of said horizontal structure of said anchoring frame assembly.

18. The unit as recited in claim 15, wherein said second actuating means includes:
an auxiliary frame means pivotally attached to said anchoring frame assembly for pivotal movement toward and into contact with the vehicle frame; and
a telescopible actuator pivotally attached to and extending between said auxiliary frame means and said anchoring frame assembly for pivoting said anchoring frame assembly relative to said auxiliary frame means and thereby to the vehicle frame when the auxiliary frame means is in contact with the vehicle frame.

19. The unit as recited in claim 18, wherein each of said upper link arms of said pairs thereof is a telescopible actuator being attached at its opposite ends to upper ends of said vertical structure of said anchoring frame assembly and said upright structure of said lifting frame assembly and being operable to pivot said upright structure of said lifting frame assembly about its connection to each of said lower link arms of said pairs thereof.

20. The unit as recited in claim 15, further comprising:
locking means for connecting said upright structure of said lifting frame assembly to said horizontal structure of said anchoring frame assembly after said lifting frame assembly is moved to said partially raised position to form said anchoring and lifting frame assemblies into a substantially rigid towing beam interconnecting the fifth wheel of the towing vehicle and the mobile load.

21. The unit as recited in claim 20, wherein said locking means includes:
complementary elements respectively defined on said upright structure of said lifting frame assembly and on said rear portion of said horizontal structure of said anchoring frame assembly being alignable with one another; and
releasable fastener elements for interengaging said complementary elements when the latter are aligned with one another and thereby interconnecting said upright structure of said lifting frame assembly to said horizontal structure rear portion of said anchoring frame assembly.

22. The unit as recited in claim 21, wherein:
said complementary elements are pairs of apertures defined in said upright structure of said lifting frame assembly and in said horizontal structure rear portion of said anchoring frame assembly; and
said fastener elements are releasable locking pins.

23. The unit as recited in claim 15, wherein said horizontal structure of said anchoring frame assembly has a king pin mounted at said front portion for coupling the fifth wheel of the towing vehicle.

24. The unit as recited in claim 15, wherein said load engaging structure is in the form of rearwardly projecting members releasably mounted to said upright structure adjacent a lower end thereof for laterally adjusted movement toward and away from one another.

25. The unit as recited in claim 24, wherein said members are mounted to said upright structure for pivotal movement between generally horizontal support and vertical storage positions.

26. The unit as recited in claim 15, wherein said load engaging structure of said lifting frame assembly is a power winch mounted to said upright structure.

27. The unit as recited in claim 15, wherein said load engaging structure of said lifting frame assembly is a carriage unit mounted to said upright structure adjacent to a lower end thereof.

28. A lifting and towing unit for use by a towing vehicle having a fifth wheel supported on a frame of the towing vehicle, said unit comprising:
    (a) an anchoring frame assembly having a generally horizontal structure with front and rear portions and being adapted to be coupled at said front portion to a fifth wheel of a towing vehicle, said anchoring frame assembly also having a generally vertical structure rigidly mounted upright to said front portion of said horizontal structure;
    (b) a lifting frame assembly having an upright structure and load engaging structure mounted to said upright structure and being adapted to support a portion of a mobile load and to be releasably attached thereto;
    (c) a linkage arrangement extending between and interconnecting said upright structure of said lifting frame assembly to said vertical structure of said anchoring frame assembly for providing pivotal movement of said lifting frame assembly relative to a frame of the towing vehicle away from and toward a lowered position wherein said load engaging structure of said lifting frame assembly is capable of being placed in a supporting relationship with the mobile load portion for lifting the mobile load into a towing relationship behind the towing vehicle and a fully raised position wherein said load engaging structure of said lifting frame assembly is capable of supporting the mobile load at the portion thereof to maintain the mobile load in said towing relationship behind the towing vehicle; and
    (d) an actuating mechanism being selectively operable to move said lifting frame assembly relative to the frame of the towing vehicle from said fully raised to said lowered position for placing said load engaging structure of said lifting frame assembly in said supporting relationship with the mobile load portion and from said lowered to said fully raised position for lifting the mobile load into said towing relationship, said actuating mechanism including
        (i) first actuating means being selectively operable to move said lifting frame assembly relative to said anchoring frame assembly between said lowered position and a partially raised position spaced below said fully raised position, and
        (ii) second actuating means being selectively operable to move said anchoring frame assembly relative to the frame of the towing vehicle after being coupled to the fifth wheel thereof and thereby move said lifting frame assembly relative to the vehicle frame between said partially and fully raised positions.

29. The unit as recited in claim 28, further comprising:
    locking means for connecting said upright structure of said lifting frame assembly to said rear portion of said horizontal structure of said anchoring frame assembly after said lifting frame assembly is move to said partially raised position to form said anchoring and lifting frame assemblies into a substantially rigid towing beam interconnecting the fifth wheel of the towing vehicle and the mobile load.

30. The unit as recited in claim 28, wherein said second actuating means includes:
    an auxiliary frame means pivotally attached to said anchoring frame assembly for pivotal movement toward and into contact with the vehicle frame; and
    a telescopible actuator attached to and extending between said auxiliary frame means and said anchoring frame assembly for pivoting said anchoring frame assembly relative to said auxiliary frame means and thereby to the vehicle frame when the auxiliary frame means is in contact with the vehicle frame.

* * * * *